June 26, 1928. 1,675,065
C. O. THOMAS
FLEXIBLE SHAFT COUPLING
Filed March 20, 1926
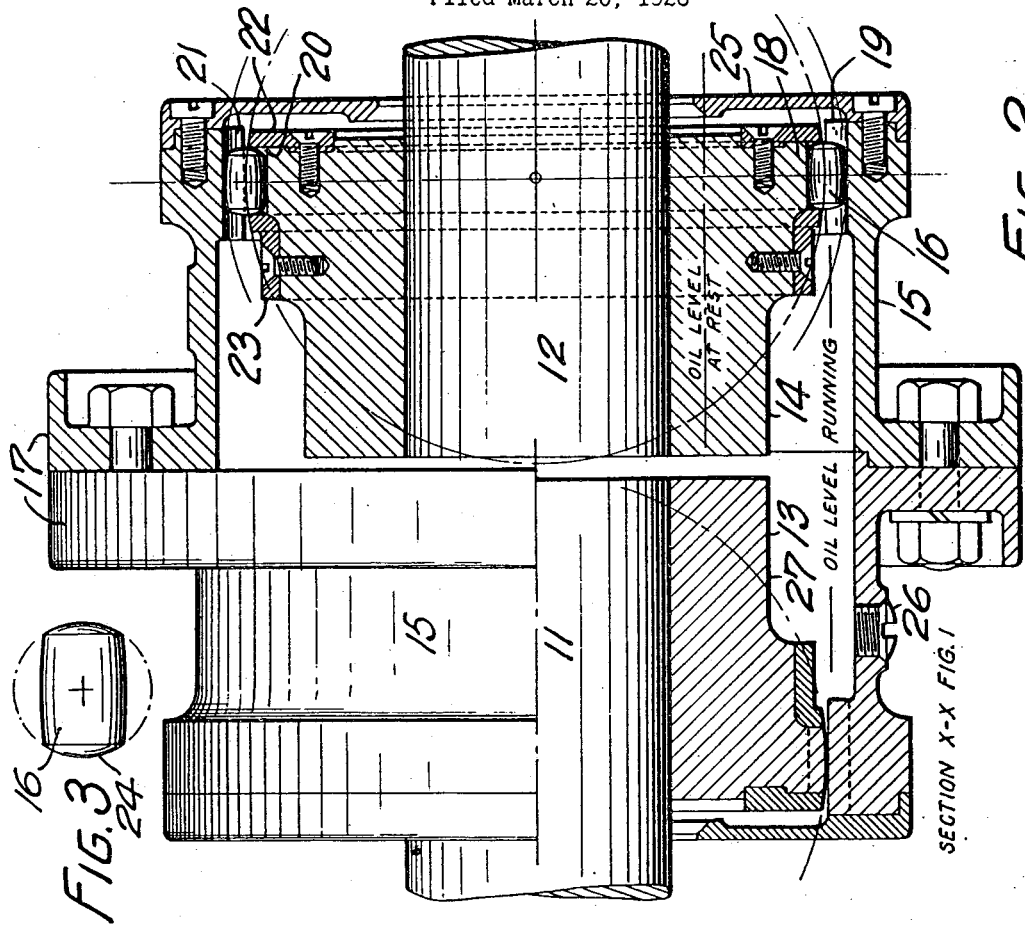
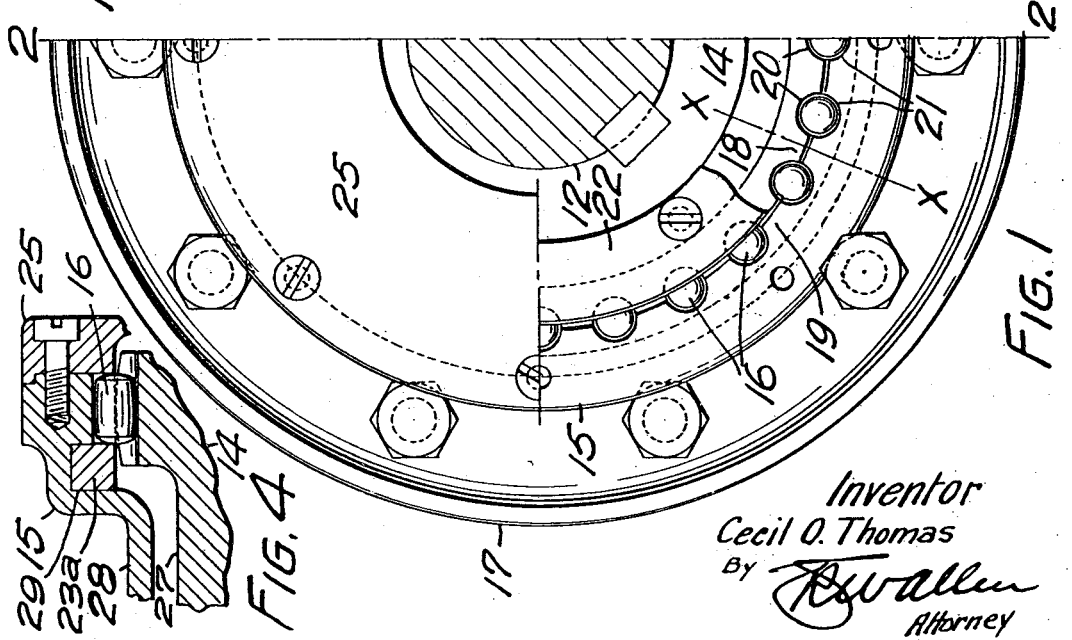
Inventor
Cecil O. Thomas
By
Attorney Patented June 26, 1928.

1,675,065

UNITED STATES PATENT OFFICE.

CECIL OLDRIEVE THOMAS, OF MONTREAL, QUEBEC, CANADA.

FLEXIBLE SHAFT COUPLING.

Application filed March 20, 1926. Serial No. 96,295.

This invention relates broadly to shaft couplings and the like and more particularly to flexible couplings designed to serve as a driving connection between two nominally aligned shafts which may become slightly misaligned or which may move relatively to one another in their axial direction.

The primary object of the invention is the provision of a flexible shaft coupling, which will transmit power from shaft to shaft without lost motion or yielding and with a minimum of loss due to friction.

Another object allied with the first is the provision of a coupling so constructed that lubrication of the working parts is automatic and efficient.

A further object is uniform distribution of load all around the coupling at all times.

A still further object is to produce a coupling which will transmit, at any instant, the exact angular speed of the driving shaft.

Another object is to provide an extremely efficient, durable and simple coupling which may be manufactured, installed and maintained very easily and at relatively small expense.

Various additional objects and the advantages of the invention may be ascertained from the following description and drawings illustrative thereof.

A great variety of flexible shaft couplings have been produced or proposed and suffer from one or more disadvantages inherent to their construction, such as;—excessive friction due to design or to faulty lubrication; complexity of construction entailing high manufacturing cost with difficulty of installation and maintenance; lack of uniformity in load distribution frequently with consequent localized wear; inexact and variable speed and power transmission; imperfect centering; limited or variable flexibility; or other defects.

According to the present invention, the disadvantages enumerated, and others, are completely or largely eliminated. Briefly, the invention resides in the provision of a pair of male or hub members to be connected to the driving and driven shafts, respectively, and a female or sleeve member encircling both hubs and having driving connection therewith through a series of members, each located partly in the sleeve and partly in a hub, the hubs and/or the driving members also preferably being formed to produce, in effect, a spherical or ball joint so located that lubrication is effected automatically and efficiently at all speeds and under all load conditions. The arrangement is such that the load is distributed uniformly among all the connecting members and also such that the force and speed of the driving shaft, at any instant, is transmitted substantially without variation to the driven shaft.

In the accompanying drawings which illustrate one embodiment of the invention, now preferred, and a modification thereof, but to which embodiment or modification the invention is not confined:—

Fig. 1 is a half end elevation of a shaft coupling, the end rings of the hub and sleeve being in part cut away.

Fig. 2 is a view partly in side elevation and partly in section at the lines 2—2 and X—X of Figure 1.

Fig. 3 is a plan view of a connecting member on an enlarged scale as compared with Figures 1 and 2.

Fig. 4 is a fragmentary sectional view, corresponding to the section at the line 2—2, Figure 1, disclosing several modifications of the structure shown in Figures 1 and 2.

Referring more particularly to the drawings, 11 and 12 designate, respectively, two shafts to be connected which are arranged end to end in spaced relation as shown.

A double coupling, such as shown in the drawings, comprises, essentially, a pair of similar male members or hubs designated 13 and 14, respectively, adapted to be irrevolubly connected to the shafts; a female member or sleeve 15 encircling the hubs; and a series of connecting members 16 engaging the sleeve and hubs. For convenience of manufacture, installation and maintenance of the coupling, the sleeve is formed in two substantially similar halves, each provided with an end flange 17 for bolting the two halves together. For simplicity in the following description, the sleeve will be regarded as unitary.

Each hub is provided at one end with an outwardly projecting flange 18 and each end of the sleeve is provided with an inwardly projecting flange 19, the hub flanges being snug running fits within the sleeve flanges when the parts of the coupling are assembled. In the embodiment shown in Figures 1 and 2, the sleeve flanges are materially longer than the hub flanges in the axial direction of the coupling and, at their inner peripheral surfaces, are truly cylindrical and coaxial with the sleeve. The outer peripheral surface of each hub flange is spherically curved from a centre located in the hub axis midway between the planes of the flange ends, as clearly shown in Figure 2. This spherical curvature of the hub flanges ensures exact centering of the sleeve upon the hub flanges in any angular misalignment of the hubs and sleeve and, when combined with a properly balanced sleeve, eliminates improper movement with consequent vibration when the coupling is running.

The hub and sleeve flanges are provided with series of grooves 20 and 21 respectively, extending longitudinally of the sleeve and hubs and preferably, but not necessarily, parallel with the axes thereof, the grooves of corresponding hub and sleeve flanges being mated or in exact register when the parts are in alignment. Preferably, but not necessarily, the grooves are each semi-cylindrical, so that when in register they form a series of perfectly cylindrical bores each formed half in a hub and half in the sleeve. The grooves are preferably located parallel with the axis of the member in which they are formed and parallel with one another, but may be otherwise arranged. The long edges of these grooves are preferably very slightly rounded, the amount being too small for illustration to the scale of Figures 1 and 2, in reality probably less than one-thirty-second part of an inch radius in a medium or large size bearing, the purpose being to remove the extreme sharp edges of the grooves which might, under heavy load, become burred or chipped, thus possibly rendering the coupling stiff and reluctant in action.

In the particular embodiment shown, the grooves are formed completely through the flanges, that is, from end to end of the flanges and, in the case of the shorter hub, flanges are closed at their ends by any suitable means such as the detachable outer and inner end rings 22 and 23, respectively, the outer peripheral surfaces of which rings are spherically curved in continuation of the spherical flange curvature. The detail construction described and illustrated in this particular is that now preferred on account of ease of manufacture, but is not essential since the groove ends may be closed in other ways, or the rings may be shrunk or welded on.

In manufacture of the coupling, it is found expedient to turn the hub flanges to a very snug fit in the sleeve flanges and then, with the hubs assembled in the sleeve, to drill and ream out the grooves so that exact register of the grooves may be obtained when the parts are again assembled according to marks provided and each groove brought together with its original mate. If the whole series of grooves in an end of the coupling is not formed in one operation, as on a gang drill, the first hole drilled should be plugged with a tightly fitting pin to prevent relative rotation of the hub and sleeve during drilling of the remaining holes. The same applies to the reaming operation. After formation of the grooves, the hubs are removed and, with the end rings in place (if such are employed) the hub flanges are turned or ground to the desired spherical curvature and proper clearance from the sleeve flanges. This method of manufacture, while seemingly a mere matter of shop practice, is in reality an important, if not indispensable, part of the invention and it or its equivalent is essential to the successful operation of the coupling and to the attainment of an important object. It may be observed that this method practically eliminates the use of expensive jigs and also eliminates the inaccuracies which inevitably follow from wear of jigs due to repeated use, from temperature variations, from slackness in machines and from other causes.

The connecting members 16 correspond in cross section with the cross section of the grooves and are seated in the passages formed by the mated grooves of the hub and sleeve flanges and afford driving connection between the hubs and sleeve. These members 16, which are preferably circular in cross section to correspond with the preferably cylindrical bores formed by the mated grooves may be of many forms. The form now preferred is that illustrated and may be described as barrel-shaped and the members themselves referred to as pins or driving pins. The longitudinal curvature of the pins is preferably substantially concentric with the spherical curvature of the hub flanges when the pins are in place in the hub flange grooves, as shown in Figure 2. The pins are, at their maximum diameters, snug fits in the flange grooves. The ends 24 of each pin are preferably spherically curved from a centre located at the intersection of the pin axis and the transverse plane of greatest diameter, as shown in Figure 3. When the pins are thus formed at the ends, they are an easy fit between the hub flange end rings, so that there is substantially no end play permitted to the pins. If the pins are otherwise formed at the ends, some free play must be allowed. The barrel formation and spherical end formation are not inseparably allied, since either may be combined with alternatives for the other.

The coupling is completed by provision of annular end rings 25 preferably detachably secured to the sleeve, the central openings of the rings being sufficiently large to permit maximum eccentric location of the shafts without contact of the rings with the shafts. These rings make oil tight joints with the sleeve, as do the sleeve halves with one another, so that when the coupling is at rest oil may be retained therein up to the level of the lowest point of the ring openings. The sleeve may be provided with any suitable number of drain plugs 26 for removal of oil therefrom. If desired, the end of each hub opposite the flange may be reduced in diameter, as shown at 27, to provide additional accommodation for oil. On the other hand, the sleeve may be reduced in diameter opposite the reduced ends of the hubs, as shown at 28, Figure 4, thus reducing the oil capacity but concentrating the oil at the ends where the driving connections are located.

In Figure 2, the connections are shown as held against longitudinal movement in the hub grooves and free for such movement in the sleeve grooves. The reverse condition is shown in Figure 4 with corresponding transfer of the end rings from the hubs to the sleeve. In this form, the existing sleeve end ring 25 serves to replace the ring 22 and the inner ring 23 is replaced by a ring 23ᵃ preferably split and expanded into a groove 29, already formed in case of the combination illustrated between the sleeve flange and the reduced portion 28 of the sleeve.

In operation, rotation of the driving shaft, say the shaft 11, is transmitted from its hub 13 through the pins 16 to the sleeve and from the sleeve through the pins 16 at the other end to the hub 14 and thence to the shaft 12. There being substantially no clearance between the sleeve and hub flanges, the bearing points on the pins are diametrically opposite and the pins are in compression, subject to shearing effect. Owing to the method of forming the pin grooves or seats, the load is uniformly distributed between the pins irrespective of any slight irregularity in circular spacing of the pins. If the shafts are in alignment, there is no movement between the coupling parts but, if the shafts are out of alignment, the misalignment is divided between the two ends of the coupling and the angle between the sleeve axis and the axis of either hub is half the total angle of misalignment.

When the coupling is running under misalignment conditions, each hub oscillates in the sleeve about an axis, passing through the intersection of the hub and sleeve axes and at right angles to both. The spherical surface formation of the hub flanges and the barrel shape of the pins render the oscillating movement very easy and smooth, in fact the hubs and sleeve constitute a double ball joint concentric with the intersections of the sleeve and hub axes. Barrel-shaped pins, as illustrated, present to the bottoms of the sleeve flange grooves lines of bearing coinciding with the surfaces of imaginary spheres concentric with the spherical curvature of the hub flanges.

In considering the action of the pins, only those the maximum distance on opposite sides of and those on the axis of oscillation need be studied. Those pins which are the maximum distance on opposite sides of the axis of oscillation have only one movement, namely, a sliding or skidding action in the sleeve flange grooves (owing to the rings 22, 23 holding them against such movement in the hub flange grooves). Owing to the curvature of the pins, they act in this skidding movement exactly as if they were parts of a sphere centered at the intersection of the hub and sleeve axes. The pins at the ends of the axis of oscillation have an altogether different action. Owing to the relative oscillation of the hub and sleeve, the mating hub and sleeve grooves at the ends of the oscillation axis are relatively oscillated to exactly the same angular extent as the hub and sleeve. As a result, the pin engaged in these two grooves oscillates relatively to both grooves half the amount of relative groove oscillation. This oscillation of the pin in approximately the circumferential direction of the coupling is possible, because of the double taper or barrel shape of the pin. By judicious proportioning of the outside diameter of the hub flanges to the maximum angle of misalignment permitted the longitudinal curvature of the pins necessary for proper ball action when on opposite sides of the axis of oscillation will be for all practical purposes the same as the cycloidal curvature necessary to maintain the pins in uniformly easy rolling relation to the grooves at the ends of the axis of oscillation. If the taper of the pins is not sufficient for the misalignment conditions to be met, the pins will be subjected to excessive shearing action at their ends and may fracture, while if their taper is too great they will become loose in the relatively oscillated grooves at maximum misalignment and will not transmit their calculated portion of the load but will throw their calculated load upon the pins on opposite sides of the axis of oscillation, thus overloading these pins. From the foregoing, it will be seen that a proper relation must be established between the pitch diameter of the coupling and the maximum misalignment angle, which vary inversely.

The pins in the quadrants of the coupling intermediate those just discussed have a compound action, partly sliding and partly rolling, the degree of each action varying according to the position of the pin. Obviously, as the coupling rotates, the action of each pin changes from, say, purely sliding to purely rolling or oscillating and back to purely sliding movement. It is largely because of the relative oscillation of the mated grooves that great accuracy must be attained in their forming, in order to secure effective action of the pins and constant uniform distribution of load among the pins. Therefore, the method of manufacture previously described and which produces the necessary accuracy is deemed an important feature of the invention.

The spherical formation of the pin ends enables the pins to oscillate in the hub grooves as described. If the pin ends were flat, appreciable clearance would be necessary between the pin ends and the rings 22 and 23 to permit pin oscillation or, failing this, a greater taper would be necessary, which might interfere with their proper sliding action in the sleeve slots and might cause them to jam, but it will be understood that by providing sufficient clearance flat-ended or plain cylindrical pins may be used and that, with special groove formation, clearance may be dispensed with. All the effects produced by the barrel-shaped pins may be obtained from suitably double-tapered pins rectangular in cross section operating in correspondingly shaped grooves. Obviously, all the effects described may also be obtained using balls instead of pins.

When the coupling is in operation, the oil therein is distributed by centrifugal action around the inside of the sleeve. The location of the sleeve grooves as nearly as possible at the extreme internal diameter of the sleeve ensures a supply of oil to the grooves, thereby ensuring efficient lubrication for the pins when sliding in the grooves. Furthermore, the pressure of oil increases with the speed and keeps pace with increasing outward thrust of the pins against the sleeve due to centrifugal action.

In the arrangement shown in Figure 4, wherein the pins are held in the sleeve and slide in hub grooves, there is one advantage, namely, that centrifugal force acting on the pins does not increase the frictional resistance to sliding but, on the contrary, diminishes it. While the pins have been described as sliding in this construction, it will be seen that their action in hub grooves is rather a rolling action. Even in the arrangement shown in Figure 1, the sliding consequent upon misalignment at high speed will take place in the hub grooves to an extent equal to any end play that may be permitted the pins. This will serve to distribute groove wear consequent to sliding.

Owing to the fact that the pins are free to slide in the grooves of one member at each end of the coupling, the coupling accommodates itself to movement of the shafts axially toward or away from one another. The double hub arrangement illustrated and described is preferred, since it accommodates itself to both angular and parallel misalignment of shafts, but where only angular misalignment is to be dealt with a single hub in one end of the sleeve will suffice the other end of the sleeve being rigidly connected to a shaft.

With the construction shown, the sleeve is maintained accurately centered on the hubs in all positions of oscillation both by the spherical curvature of the hub flanges and by the pins which collectively form for each hub a second spherical bearing surface in the sleeve. If the hub or sleeve surface should become worn and produce excessive clearance with consequent faulty centering, the defect may be remedied by insertion of slightly oversize pins which will accurately centre the sleeve. From the foregoing it follows that double tapered pins circularly curved longitudinally may be the sole centering and supporting means of the sleeve and that in consequence the spherical curvature of the hub flanges and contact thereof with the sleeve entirely dispensed with, although such construction is not advocated since it throws additional load on the pins, concentrates wear in the hub and sleeve grooves and tends to invite jamming of the pins between the hubs and sleeve.

While that embodiment of the invention which is now preferred has been illustrated and described, it is to be understood that the invention in its broad aspects is not confined to any or all of the details disclosed, which are given for explanation and without limitative intent, but contemplates all such modifications, substitutions and combinations thereof with one another and with the features herein set forth as fall within the scope of the appended claims, also application of the principles and features of detail to devices other than shaft couplings.

The pins may be either solid or hollow, the latter having the advantage that at high speed their outward pressure on the sleeve due to centrifugal action will be less than in the case of solid pins.

Having thus described my invention, what I claim is;—

1. A shaft coupling comprising a pair of hub members arranged end to end and having outwardly facing recesses therein, a sleeve member encircling the hubs and having inwardly facing recesses registering with the hub member recesses at each end of the coupling, the recesses of one of said members being longer than the recesses of the other member, and a series of connecting members located in the recesses of the hubs and sleeve and forming driving connections between the hubs and sleeve, said connecting members each occupying substantially the full length of the shorter recess in which it is engaged and means releasably secured to the member having the shorter recesses holding the connecting members against movement in the shorter recesses longitudinally thereof.

2. A shaft coupling comprising a sleeve member having a cylindrical bore, a hub member therein having a spherically surfaced portion bearing in the cylindrical bore of the sleeve member, said members being formed with longitudinally extending mating recesses, and non-spherical means located in the recesses holding the members against relative rotation while permitting relative oscillation and relative sliding movement in the axial direction of the members.

3. A shaft coupling comprising a sleeve member having a cylindrical bore, a hub member therein having a spherically surfaced portion bearing in the cylindrical bore of the sleeve member, said members being formed with longitudinally extending mating recesses, and means longitudinally curved and tapering toward both ends located in the recesses holding the members against relative rotation while permitting relative oscillation and relative sliding movement in the axial direction of the members.

4. A shaft coupling comprising a sleeve member, a hub member therein having a spherically surfaced portion bearing in the sleeve member, the bearing portions of said members being formed with mating longitudinally extending recesses, and means located in said recesses holding the members against relative rotation while permitting relative oscillation of the two and means releasably secured to one of the members holding the aforesaid means against movement relative to the member in the longitudinal direction of the coupling.

5. A shaft coupling comprising a sleeve member, a hub member therein having a spherically surfaced portion bearing in the sleeve member, the bearing portions of said members being formed with similar mating recesses, and pins located in the recesses holding the members against relative rotation while permitting universal relative oscillation of the two and means releasably secured to one of the members holding the pins against movement relative to the member in the longitudinal direction of the coupling.

6. A shaft coupling comprising a sleeve member, a hub member therein having a spherically surfaced portion bearing in the sleeve member, the bearing portions of said members being formed with mating recesses, and pins tapering toward both ends located in said recesses holding the members against relative rotation while permitting relative oscillation of the two.

7. A shaft coupling comprising a sleeve member, a hub member therein having a spherically surfaced portion bearing in the sleeve member, the bearing portions of said members being formed with mating recesses, and barrel-shaped pins located in said recesses holding the members against relative rotation while permitting relative oscillation of the two.

8. A shaft coupling comprising a sleeve member, a hub member therein having a spherically surfaced portion bearing in the sleeve member, the bearing portions of said members being formed with mating recesses, and pins located in said recesses holding the members against relative rotation while permitting relative oscillation of the two, the outermost longitudinal lines of said pins being circular curves centered coincidently with the centre of the spherically surfaced portion of the hub member.

9. A shaft coupling comprising a sleeve member, a hub member therein having a spherically surfaced portion bearing in the sleeve member, the bearing portions of said members being formed with elongated longitudinally extending mating recesses, and means located in said recesses holding the members against relative rotation while permitting relative oscillation of the two, and rings carried by one of the members operative to impart oscillatory movement thereof to the holding means whereby the holding means is moved relatively to the other member.

10. A shaft coupling comprising a sleeve member, a hub member therein, having a spherically surfaced portion bearing in the sleeve member, the bearing portions of said members being formed with elongated longitudinally extending mating recesses, means located in said recesses holding the members against relative rotation while permitting relative oscillation of the two, and rings carried by the hub member limiting movement of the holding means lengthwise of the recesses of the hub member.

11. A shaft coupling comprising a sleeve member, a hub member therein having a spherically surfaced portion bearing in the sleeve member, the bearing portions of said members being formed with mating recesses, and pins tapering toward both ends located in said recesses holding the members against relative rotation while permitting relative oscillation of the two, and means carried by the hub member limiting movement of the pins lengthwise of the recesses of the hub member.

12. A shaft coupling comprising a sleeve member, a hub member therein having a spherically surfaced portion bearing in the sleeve member, the bearing portions of said members being formed with mating recesses, pins tapering toward both ends located in said recesses holding the members against relative rotation while permitting relative oscillation of the two, and means carried by the hub member limiting movement of the pins lengthwise of the recesses of the hub member, the ends of said pins being spherically curved from centers located at the intersections of the pin axes and the transverse planes of greatest diameter.

13. A shaft coupling comprising a sleeve member and a hub member therein, adjacent surfaces of the members being formed with mating recesses, and pins located in the hub member and sleeve member recesses holding the hub member centered within the sleeve member and against rotation relative to the sleeve member while permitting relative oscillation of the members, means holding the pins against movement relatively of the hub in the axial direction thereof, the said pins being each so tapered toward both ends that they collectively constitute the equivalent of a spherically curved bearing surface for the hub member in engagement with the sleeve.

14. In a shaft coupling, a pair of hubs, a sleeve encircling the hubs, said hubs and sleeve having longitudinally disposed mating grooves in adjacent faces thereof, and pins located in the grooves and forming driving connections between the sleeve and hubs, said pins being longitudinally surface curved and each tapered toward both ends and carried by the hubs for positive bodily movement in their axial direction upon relative oscillation of the hubs and sleeve.

15. In a shaft coupling, a pair of hubs, a sleeve encircling the hubs, said hubs and sleeve having longitudinally disposed mating grooves in adjacent faces thereof, and pins located in the grooves and forming driving connections between the sleeve and hubs, said pins being longitudinally surface curved and each tapered toward both ends, and the ends of each pin being substantially spherically curved from a centre coincident with the geometric centre of the pin and means holding the pins against movement longitudinally of the hubs.

16. In a shaft coupling, a hub, a sleeve in encircling engagement with the hub, said sleeve and hub having longitudinally disposed mating grooves therein, pins tapering toward their ends located in the grooves and forming driving connections between the sleeve and hub, the diameters of the engaging surfaces of the sleeve and hub being so related to the maximum angle of misalignment for which the coupling is designed that the cycloidal curve developed by the edges of mating grooves at the ends of the axis of hub and sleeve oscillation is substantially the same as a circular curve described at a radius equal to the radius of the engaging hub and sleeve surfaces plus the maximum radius of one of the pins.

17. A shaft coupling comprising male and female members and driving pins disposed longitudinally of the members to connect the members, the longitudinal surface of each of said pins being developed by rotation of a circular arc about its chord.

18. A shaft coupling comprising male and female members and driving pins to connect the members, the longitudinal surface of each of said pins being developed by rotation of a circular arc about its chord, and each pin being spherically curved at its ends, the centre of end curvature being located at the intersection of the pin axis and the transverse plane of greatest diameter.

In witness whereof, I have hereunto set my hand.

CECIL OLDRIEVE THOMAS.